United States Patent [19]

Erdol et al.

[11] Patent Number: 5,103,427
[45] Date of Patent: Apr. 7, 1992

[54] METHOD AND APPARATUS GENERATING HIGH RESOLUTION DATA AND ECHO IDENTIFICATION

[75] Inventors: Nurgun Erdol, Highland Beach, Fla.; Louis E. Roemer, Akron, Ohio

[73] Assignee: The University of Akron, Akron, Ohio

[21] Appl. No.: 527,197

[22] Filed: May 22, 1990

[51] Int. Cl.$^5$ .............................................. G03B 42/06
[52] U.S. Cl. ....................................... 367/7; 367/11; 128/660.01
[58] Field of Search .................. 367/7, 11, 87, 135; 364/421; 342/192; 128/660.01; 73/602, 607, 620, 627

[56] References Cited

U.S. PATENT DOCUMENTS

4,862,180  8/1989  Martin ................................. 342/192

*Primary Examiner*—Daniel T. Pihulic
*Attorney, Agent, or Firm*—Oldham & Oldham Company

[57] ABSTRACT

The present invention is generally directed to an apparatus and method of echo identification wherein the sources of echoes generated from interface boundaries in a medium may be more effectively identified in the processing of obtained waveform data to generate higher resolution in the obtained data. The method of the present invention is particularly useful for performing ultrasound reflectometry and medical sonography by obtaining data representative of a medium being studied and suppressing signals from overlapping echo waveforms generated from obstacles adjacent an object under test. More particularly, the method of the invention enables the sources of such echo waveforms to be more effectively identified to yield an indication of the contribution of overlapping echoes to generate higher resolution data signals. The processing includes generating a power spectral estimate of the data which is utilized to obtain a phase estimate thereof. The Maximum Entropy Estimation Method is used to obtain a reliable phase estimate which can then be processed to yield an indication of the delay time to an interface boundary in the medium. The sources of the echo waveforms can then be located and used to increase the resolution of the obtained data.

21 Claims, 10 Drawing Sheets

METHOD AND APPARATUS GENERATING HIGH RESOLUTION DATA AND ECHO IDENTIFICATION

TECHNICAL FIELD

The present invention is generally directed to on apparatus and method of echo identification wherein the sources of echoes generated from interface boundaries in a medium may be more effectively identified in the processing of obtained waveform data to generate higher resolution in the obtained data. The method of the present invention is particularly useful for performing ultrasound reflectometry and medical sonography by obtaining data representative of a medium being studied and suppressing signals from overlapping echo waveforms generated from obstacles adjacent on object under test. More particularly, the method of the invention enables the sources of such echo waveforms to be more effectively identified to yield an indication of the contribution of overlapping echoes to generate higher resolution data signals.

BACKGROUND OF THE INVENTION

In various disciplines such as ultrasound reflectometry, medical imaging using sonography, radar, seismology, echocardiography and other similar areas, a common problem exists in that waveform data obtained in these areas will often include reflections from adjacent obstacles which will often overlap the desired echo or reflected signals. The overlapping echo waveforms tend to obscure the desired signals and result in lower resolution which inhibits effective and accurate interpretation of the data. I ultrasound reflectometry which is used for medical imaging as well as non-destructive testing applications, such obscuring echoes result in the inability to form high resolution images thereby degrading the diagnostic capabilities achievable by the procedure. Medical imaging has become an important aspect of present day medical technology and presently includes techniques such as X-ray tomography, magnetic resonance imaging (MRI) or CAT-scan techniques which themselves require relatively high cost, elaborate equipment and processing capabilities which inhibit their effective use in many situations. If higher resolution and improved ultrasound images could be obtained, this technique may considerably reduce the cost as compared to other imaging techniques while providing more accurate diagnostics in medicine.

Ultrasound has been known to be applicable for medical imaging as well as non-destructive testing as it is a mechanical wave phenomena wherein a medium under test will enable generated ultrasonic pulses or waves to propagate therein. In medical imaging techniques such a medium will be the soft tissue of the body with reflecting objects being the internal organs thereof. The waveforms used in ultrasound reflectometry as well as medical sonography are typically several cycles in length and are rapidly damped to a few wavelengths, at the resonant frequency of the transducer. The transducer is typically a piezoelectric crystal which gives rise to a sonic wave propagating into the medium under study and reflecting as echoes from reflecting surfaces within the medium which are detected by the reverse of the piezoelectric effect. In medical sonography for example, the transducer normally serves as both a transmitter and a receiver, and therefore induced vibrations must be damped quickly to avoid a very long ring-down time in order to receive echo signals. When low frequencies are chosen to obtain low attenuation of the waveforms through the medium under test, then the time waveforms of reflections from adjacent obstacles will often overlap. The overlap of echoes makes it difficult to interpret where the sources of the echoes are located and results in extremely difficult signal processing problems to obtain high resolution data which avoids the contribution of unwanted overlapping echo information.

One processing technique being echo envelope processing has been utilized, but it has been found that the received information is still significantly contaminated by obscuring overlapping echoes. The overlapping echo waveform phenomena resulting from the low frequencies chosen for ultrasound reflectometry as based upon attenuation and resolution constraints have been noted in literature such as found in an article by R. C. Kemerait and D. G. Childers entitled "Signal Detection and Extraction By Cepstrum Techniques" IEEE Transactions on Information Theory, Volume II-18, No. 6, pp. 745-749, November, 1972, as well as a publication by J. Blitz, entitled "Ultrasonics: Methods and Applications", Van Nostrand Reinhold Company, New York, 1971. In the first of these publications, there is set forth a technique for decomposing a composite signal of unknown multiple wavelets which overlap in time. Several prior procedures for achieving the decomposition of superimposed signals include inverse filtering wherein a signal is transformed by a linear time-invariant system, whose Fourier transform is the reciprocal of the transform of the signal components to be removed. In such a method, the signal must be known and the signal to noise ratio must be quite large. Decision Theory has also been used to decompose superimposed signals to estimate the echo amplitude and arrival times, but only if the signal wave shape is known. If the wavelet waveshape and number of echoes are unknown, other techniques have been looked to. The Cepstrum techniques of echo detection accomplish decomposition by means of a function of the power spectrum of the received signals to determine the timing and relative amplitudes of echoes in the system. The signal waveform is then extracted by means of complex Cepstrum techniques.

It has also been found that phase information can be used in the estimation of time delays between two received signals as described in an article by A. G. Piersol, entitled "Time Delay Estimation Using Phase Data", IEEE Transactions on Acoustics, Speech and Signal Processing, Volume ASSP-29, No. 3, pp. 471-477, June 1981. Such an estimation of time delays between two received signals using phase measurements relied upon the use of straightforward regression analysis procedures on phase estimates at properly selected frequencies in the frequency domain. Such analysis of the phase information was found to yield time delay estimates having realistic error assessments based upon non-parametric variance calculations.

Similarly, a publication by T. F. Quatieri, Jr. and A. B. Oppenheim, entitled "Iterative Techniques for a Minimum Phase Signal Reconstruction from Phase or Magnitude", IEEE Transactions on Acoustics, Speech and Signal Processing, Volume ASSP-29, No. 6, pp. 1187-1193, December, 1981, develops iterative algorithms for reconstructing a signal from a partial specification thereof in the time or frequency domains. The technique utilizes iterative algorithms for reconstructing a minimum or maximum phase signal from the phase or magnitude of its Fourier transform. Additionally, a phase unwrapping algorithm is proposed which is implemented by applying the Hilbert transform to the logarithmic value of the Fourier transform of a minimum phase sequence.

Although the information content of the phase component of systems has been recognized in different applications, the phase unwrapping techniques have inhibited their effective use with respect to processing in ultrasound reflectometry or similar systems where obscuring overlapping echoes degrade resolution. For example, in a publication by E. Poggiagliomi, A. J. Berkhout, M. M. Boone, entitled "Phase Unwrapping, Possibilities and Limitations", Geophysical Prospecting, No. 30, pp. 281-291, 1982, a phase unwrapping technique is set forth wherein the phase spectrum can only be correctly unwrapped between notches in the amplitude spectrum and other experimental difficulties are also present in the described method.

Some researchers have turned to the principle of Maximum Entropy, which involves autoregressive modeling, and which has been applied successfully to generate power spectral estimations. In publication by J. P. Burg, entitled "Maximum Entropy Spectral Analysis", Modern Spectrum Analysis, edited by D. G. Childers, IEEE Press, New York, pp. 34-41, 1978. Comparison of the maximum entropy method to some traditional techniques was analyzed in a book by A. V. Oppenheim and R. W. Schafer, entitled "Digital Signal Processing, Printice-Hall, Englewood Cliffs, New Jersey, 1975, wherein the maximum entropy method was found to produce higher frequency resolution and yield data of better dependability as it depends only upon the available data and requires simplified storage requirements owing to the infinite impulse response structure of the resulting all pole filter. The all pole filter is found to yield a smoothly changing phase estimate, which does not appear to have the experimental difficulties reported with various other methods to obtain phase estimates. Such a method has been studied by N. Erdol in a PhD dissertation entitled "Use of the Maximum Entropy Method for Phase Estimation" at the University of Akron, Akron, Ohio. In this study, it was found that phase information obtained by using maximum entropy spectral estimates could be utilized to subsequently obtain delay information from the maximum entropy phase estimation by means of discrete Fourier transformation techniques.

SUMMARY OF THE INVENTION

Based upon the foregoing, it has been found that there is a need to provide an apparatus and method which can be used to identify the source of echo signals to enable higher resolution data to be obtained by minimizing the contribution of overlapping echoes which may obscure the desired echo signals. The present invention is directed to providing a method and apparatus for identifying the locations of the sources of echoes contributing to data received in systems in applications such as ultrasound reflectometry, medical sonography, radar/sonar applications, acoustic non-destructive evaluation and testing, seismology, echocardiography and the like. The present invention is also directed to a method and apparatus for improving the resolution of received linear frequency modulated signals found in such applications, and particularly to a method and apparatus for performing ultrasound reflectometry and identifying the source of echoes in this application.

Generally, the method comprises the steps of obtaining echo signals in the form of analog data and thereafter transforming the analog data signals into a digital data sequence. A phase estimate of the digital data sequence is obtained by generating a power spectral estimate of the data signals by means of a technique known as the Maximum Entropy estimation method wherein the power spectral estimate is processed to yield the phase information. Using phase information, an estimate of the delay time of received echo signals which are reflected from an interface boundary in a medium can be obtained. With an estimate of the delay time, the distance to the interface boundary may be determined to locate the sources of echo signals, wherein such information may then be utilized to minimize the contribution of overlapping echoes to enhance the resolution of the desired echo signals in the system.

It is therefore a main object of the invention to provide a method for echo identification to improve the resolution of received echo signals.

It is another object of the invention to provide for high resolution of small structures while retaining low attenuation of current signal sources.

Another object of the invention is to provide an apparatus and method whereby phase information may be obtained from a digital data sequence of reflected echo signals to yield an estimate of delay time which can be far less than the reverberation time of obscuring echoes to minimize reverberation artifacts.

Yet another object of the invention is to provide a method for improving the resolution of linear frequency modulated signals by using the method of Maximum Entropy at all computational stages which relies only upon available data and provides higher frequency resolution as well as simple storage requirements owing to the infinite impulse response structure of the resulting all pole filter utilized in the method.

BRIEF DESCRIPTION OF THE DRAWINGS

These and other objects of the invention will become more readily apparent from a reading of the detailed description of the invention in conjunction with the drawings, wherein.

DETAILED DESCRIPTION OF THE INVENTION

Figure 1:
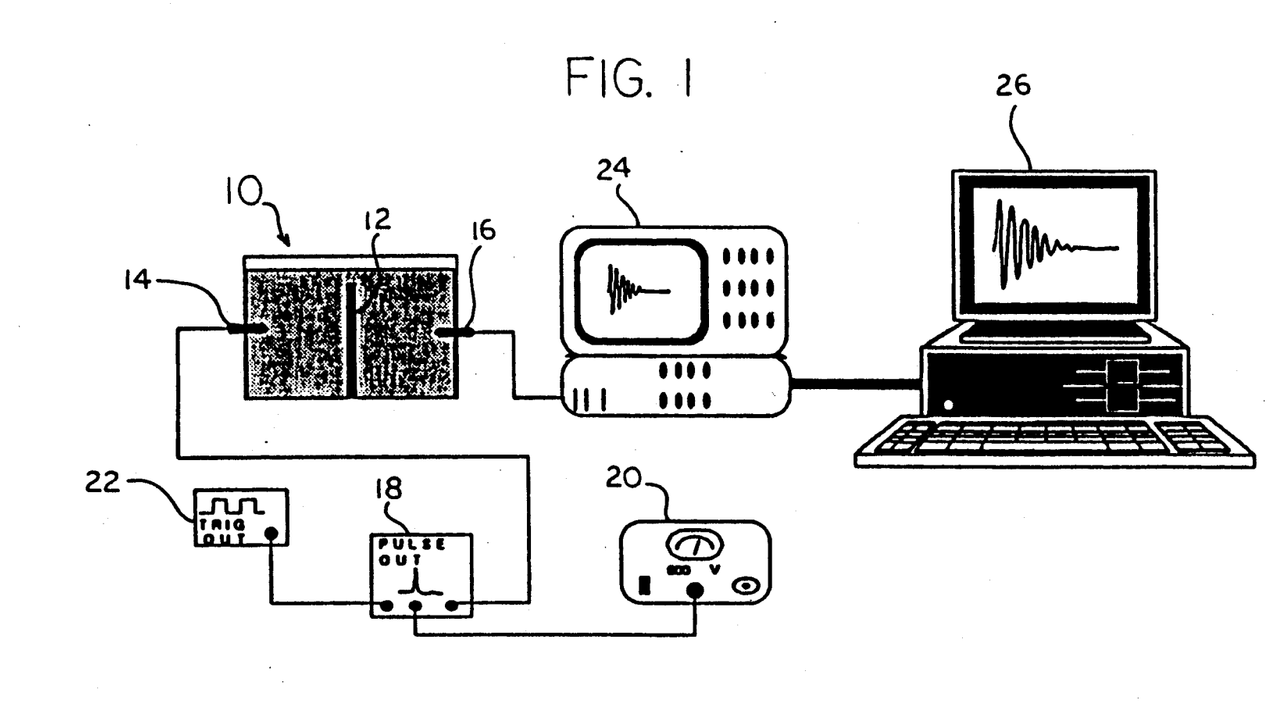
FIG. 1 shows an apparatus for generating and receiving ultrasound through an experimental medium, typifying the apparatus of the invention as used in ultrasound reflectometry.

Turning now to FIG. 1, an apparatus usable to obtain data as well as to perform processing on the received data is shown for use in an ultrasound reflectometry method. The invention will be described in terms of ultrasound reflectometry but it should be understood that the apparatus and method may be modified to suit other applications such as radar, seismology, echocardiography and other similar technologies. The apparatus as shown in FIG. 1, shows an experimental arrangement to show the method of the invention for a simplified arrangement comprising a water tank 10 having a simple reflecting structure 12 therein. The experimental arrangement including tank 10 includes a first ultrasonic pulse producing transducer 14 arranged on one side of the reflecting structure 12 and a second ultrasonic transducer 16 arranged on the opposite side of the reflecting structure 12 to receive echo waveforms. It should be recognized that depending upon the particular application of the invention, one or more transducers may be utilized. For example, in the application of medical sonography, one ultrasonic transducer will both generate ultrasonic pulses and detect echoes that return from reflecting surfaces within the body being studied. Typically, an ultrasound transducer comprises a thin piezoelectric crystal, which is made up of dipoles that are firmly bound in a crystalline structure. In ultrasound reflectometry including medical sonography, the piezoelectric crystal is made to vibrate at its natural frequency by a single voltage pulse generated by an output pulse circuit 18 having power supply 20 and a triggered output timing circuit 22. The waveforms conventionally used in ultrasound reflectometry are normally several cycles in length, wherein a typical pulse length is between 1 to 10 microseconds. Low frequencies are normally chosen to obtain low attenuation through the medium under test and the output pulse is rapidly damped to maintain a short ring-down time between the initiation of the ultrasonic wave and the cessation of all vibrations in the transducer. The ultrasound waveforms generated by transducer 14 will be detected by transducer 16 in the form of analog data signals which are transformed by a conventional A/D converter to enable display on a digital oscilloscope 24 after which the digital data signal may be processed by the method of the invention using computer 26. It is again reiterated that the particular experimental apparatus shown in FIG. 1 may be modified in a known manner by those of ordinary skill for use of the invention in the other areas of technology as previously described, wherein linear frequency modulated signals generated from echo waveform data may be obtained by suitable detection means and subsequently processed to yield an estimate of the echo contributions and to identify the source of such echoes to yield high resolution data or images.

Figure 2:
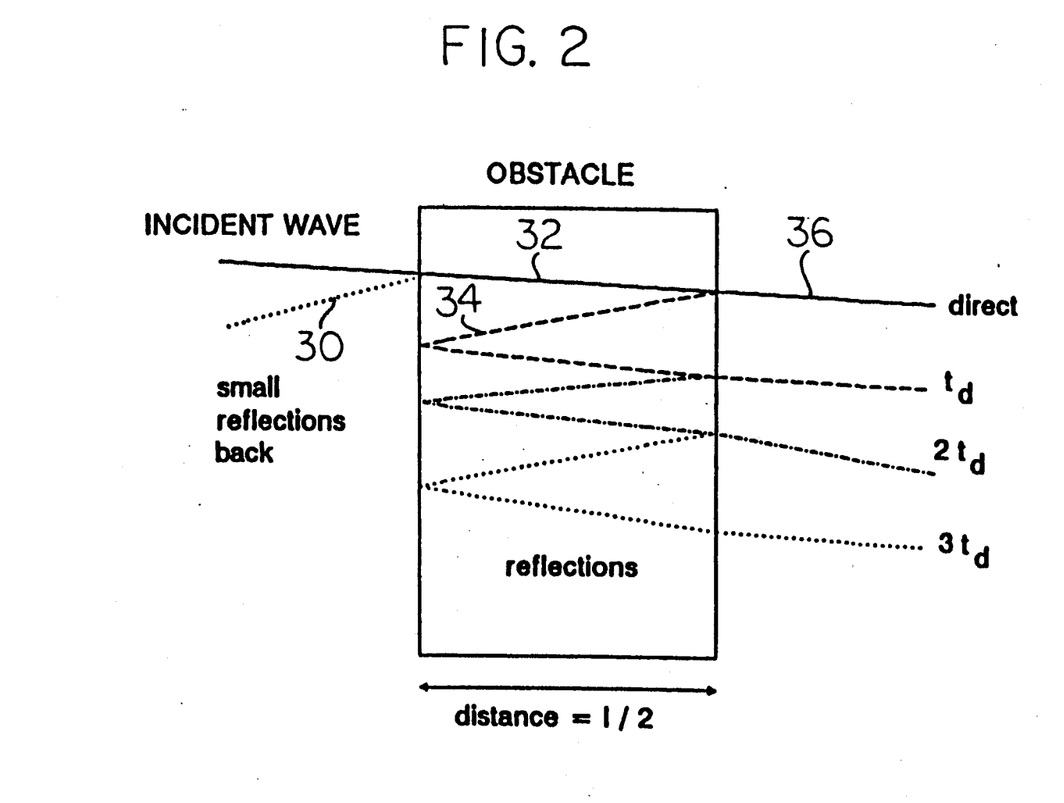
FIG. 2 sets forth a simplified representation of an ultrasonic pulse signal path within a test medium indicating the sources of echoes resulting from interface boundaries within the medium or obstacle, which may result in overlapping echo information.

In FIG. 2, there is shown the signal path for an incident wave through an obstacle in its path giving some idea of echo waveform contributions for a simple reflecting structure in the path of an incident wave. When an ultrasonic beam is incident upon a boundary between two interfaces, part of the beam will be reflected from the boundary as shown at 30 while part of the beam is transmitted into the second medium shown at. 32 being the obstacle of FIG. 2. Within the obstacle, a second interface is encountered where again part of the incident beam on the second boundary will be reflected as shown at 34 while part will be transmitted through the boundary into the medium lying beyond the boundary as shown at 36. This process continues within the obstacle creating reverberations wherein the ultrasonic beam will be attenuated by absorption and scattering until it is ultimately dissipated in the form of random molecular motion or heat. As shown in FIG. 2, an incident wave upon an obstacle having two boundary surfaces will create a number of reverberation echo signals wherein each of the echoes will have a different delay time corresponding to the thickness of the obstacle as shown in FIG. 2. The fraction of the incident beam intensity which is reflected depends upon the acoustic impedances of the mediums about the boundary, and thus the particular medium being tested will directly influence the amount of reverberation occurring within the system and the potential of generating additional echo waveforms in the system. It is also noted that the fraction of the ultrasonic beam that remains after reflection, which is transmitted into the second medium, will in general deviate from its original direction wherein the degree of deviation will depend upon the relative velocity of sound in the two media. The direction of the transmitted beam can be obtained by the application of Snell's law similar to light.

Although a relatively simple reflecting structure is shown in the apparatus of FIG. 1, in medical imaging the medium through which the ultrasonic pulses will travel will be the soft tissue and the reflecting objects will be the internal organs. Due to the low frequencies used in ultrasound reflectometry to obtain low attenuation through the medium under test, the time waveforms of reflections from adjacent obstacles, particularly in more complex systems, will often overlap. The overlap of echoes makes it difficult to interpret where the sources of the echoes are located, and thus to account for their contributions in the received echo signals thereby tending to degrade resolution of the received signals.

Figure 3:
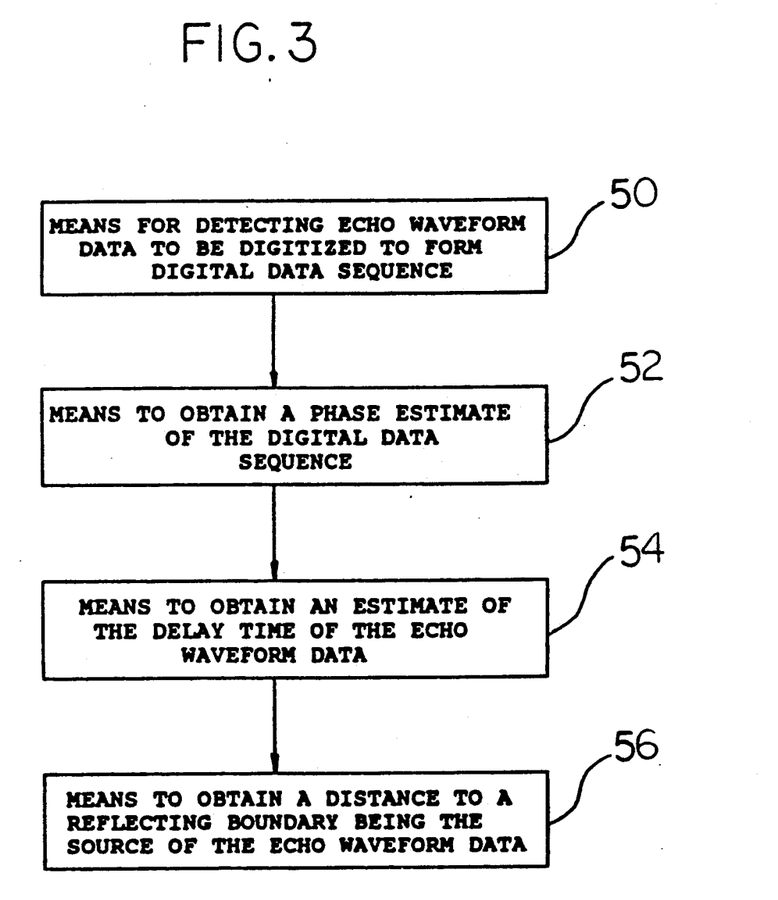
FIG. 3 sets forth a block diagram representation of the preferred method for echo identification and improving resolution as associated with a technique such as ultrasound reflectometry.

Turning to FIG. 3, there is provided a block diagram of the apparatus and method in the invention to identify the source of echo information. In general, the apparatus and method of the invention include means for detecting echo waveform data to be digitized thereby forming a digital data sequence as indicated at 50. The digital data signal is thereafter processed at 52 to obtain a phase estimate of the data signal containing information correlating to the time delay of the echo waveforms detected in the system. At 54, means are provided to obtain an estimate of the delay time of the echo waveform data from the phase estimate obtained at 52. Finally, at 56 there are means to obtain a distance to a reflecting boundary being the source of the echo waveform data which correlates to the delay time calculated in step 54. These steps form a very generalized description of the method of the invention as a means of echo identification of received waveform data.

Figure 4:
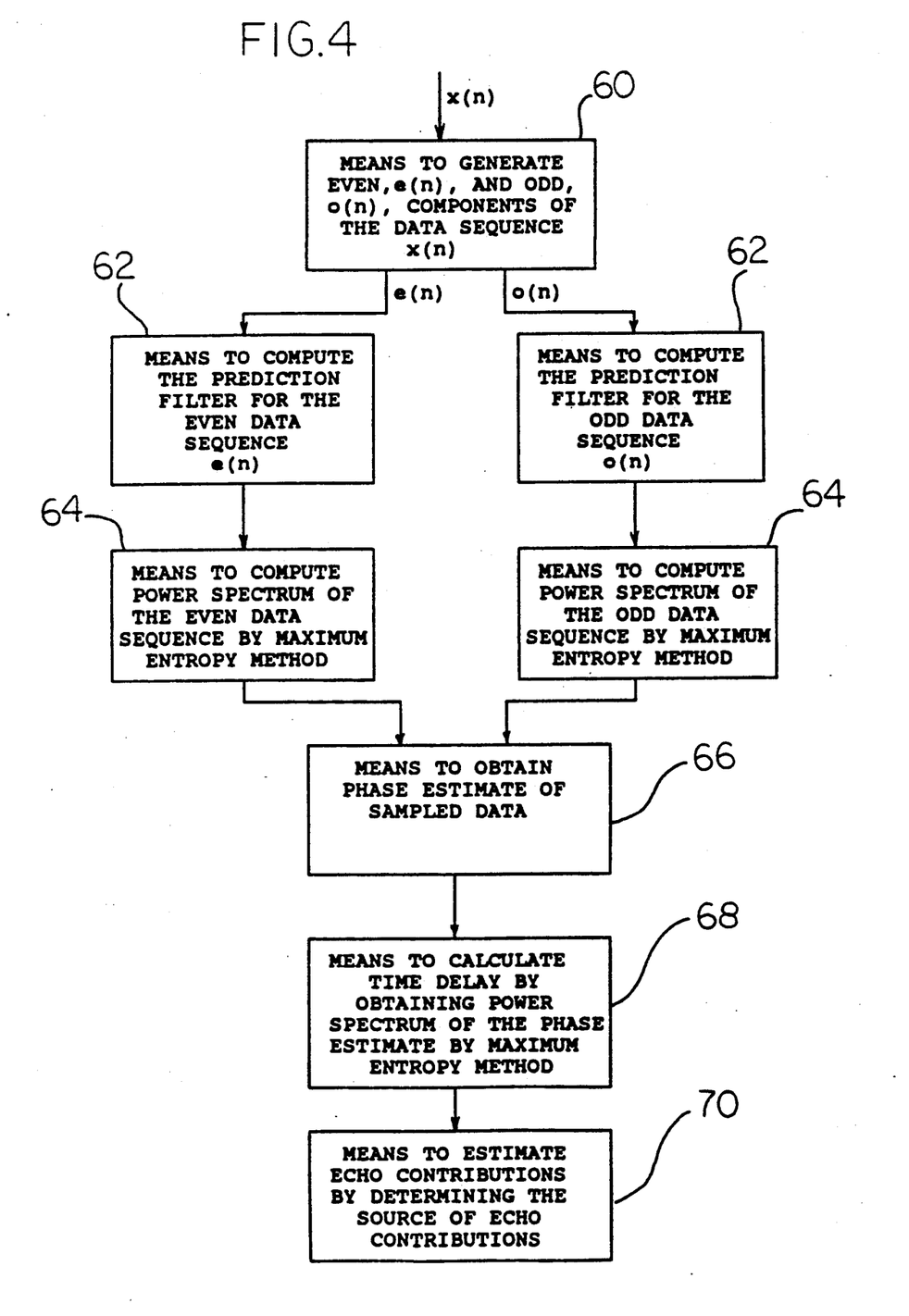
FIG. 4 sets forth a block diagram setting forth in more detail the steps of the method in the present invention to identify the sources of echo information.

The invention will now be described in more detail relative to the general procedures as outlined with reference to FIG. 3. Turning to FIG. 4, the method of the invention includes a first step in computing the coefficients of a minimum phase filter H(z) to form a prediction filter $$Y(z) = \frac{\sigma}{H(z)} \quad (1)$$

which adequately represents the digital data signal x(n). Prediction filters are computed at 62 for the even and odd data sequences generated at 60. The design of the prediction filter, represented by the even and odd constituents of the data sequence x(n), is particularly important in applications such as ultrasound reflectometry and other similar environments where the digital data signal x(n) is only partially available due to the nature of the data and its method of acquisition. In such systems, the unknown portion of x(n) must be predicted and the power spectral density is necessarily estimated, which require the predictive filter to yield as accurate a prediction of the unknown portion of the data as possible. As the power spectral density can be computed only if all of the data x(n) is known, the two methods including the prediction of the unknown portion of x(n) and the estimation of the power spectral density are related and will benefit from a model which uses only the available data to accomplish this task.

Modeling the system as an all pole, minimum phase filter provides a linear model, but it is noted that the processing preformed in the method is not linear. The all pole, minimum phase filter also simplifies storage requirements owing to the infinite impulse response structure of the filter.

The unit sample response y(n) of Y(z) is not directly related to the data x(n), however it can be shown that their respective autocorrelation values are related by:

$$R_{xx}(n) = R_{yy}(n) \quad n = 0, 1, \ldots, N \quad (2)$$

wherein N is the order of the all pole, minimum phase filter. It thus can be seen that $R_{yy}(n)$, for n greater than N, provides a non-zero extension to $R_{xx}(n)$. Since the power spectrum is the Fourier transform of its autocorrelation sequence, it can thus be shown that $$|Y(e^{j\omega})|^2 = S_{yy}(e^{j\omega}) = \left| \frac{\sigma^2}{H(z)H(1/z)} \right|_{z=e^{j\omega}} \quad (3)$$

is an estimate of the power spectrum of the data x(n). The estimation of the power spectrum is independent of the phase of $x(e^{|j\omega|})$, and the error noise power of the predictive filter is $\sigma^2$.

The invention utilizes the above mentioned filter design methodology to determine the distance to a source of echo waveform data such as the distance to a tissue interface in a medical sonography application. A brief description of the mathematical model to determine this distance is shown in the following.

A wide-band, short time duration pulse x(t), and its reflections x from an interface boundary at a distance $d_i$ can be represented at a receiver as:

$$x_r(t) = x(t) + a_i x(t - t_1) + a_2 x(t - t_2) + \quad (4)$$

where the delay time of the waveform data from the interface boundary, $t_d = 2d_i/v$, being the round trip distance to the interface boundary divided by the speed of the reflections in the medium. The term, x, represents the widening of the echo waveform as it travels through the medium and $a_i$ accounts for the attenuation of the waveform in the medium. As mentioned before, short distances involved and the widening of the echo waveform result in echoes which overlap. Windowing techniques are used to remove the overlapping parts of the received waveforms, but are often found to severely truncate the reflected waveform. The signal to be treated after windowing can be represented as:

$$y(t - t_1 - \epsilon) = a_1 x(t - t_1) \, w_\tau(t - t_1 - \epsilon) \quad (5)$$

where $\tau$ is the width of window, w, being symmetrical about $t_1 + \epsilon$, which is expected to be the center of data of the reflected signal. Due to the effects of dispersion in the medium, the center of the reflected signal is not as well defined as the incident signal, and it is thus the goal to compute $t_1 = 2d_1/v$ to enable computation of the distance $d_1$.

It is known that the incident signal x(t) is symmetrical and it is reasonable to model the medium through which the echo waveform travels as a linear phase system. Translating the center of the window to the origin (t=0) causes the center of the reflected signal to be $\epsilon$ away from the origin, where e may be positive or negative. Since a translation by $\epsilon$ in time implies a linear phase term in the frequency domain, the problem becomes one of finding the linear phase component of $a_1 x(t - \epsilon)$ from its asymmetrically truncated form $y(t - \epsilon)$.

The Maximum Entropy spectral estimation philosophy and methodology is utilized to estimate the phase and thus the delay time and therefore the distance to the interface boundary being a source of echoes. The Maximum Entropy Method enables finding an accurate estimation of the phase of a signal which would normally require complete knowledge of the signal, but wherein such knowledge is unavailable due to windowing. Although the Maximum Entropy Method uses a non-linear criterion of goodness, the predictive filter which is computed is a linear filter which generates a substitute signal for the truncated one caused from windowing. This new signal is not truncated but is not a point by point equivalent of the truncated one, although providing an accurate estimation. The power spectrum of the substitute signal has been found to be very close to the power spectrum of the original signal before truncation, and thus addresses the problem of using a power spectral estimation method to obtain phase estimation.

For simplicity of notation, we will use x(t) to denote the signal whose phase we wish to estimate. The signal x(t) is sampled to give a number of equally spaced sampled data points x(n) whose Fourier transform is $X(e^{j\omega})$. At 66 in FIG. 4, there are provided means to obtain the phase estimate of the sample data for the process x from the known data samples x(0), x(1), ..., x(M), where M is the data length being an even integer. To obtain the phase estimate, the time series x(k) is written as the sum of an even series, e(k), and an odd series o(k), where the point of symmetry is chosen at $N_S = M/2$. The power spectra of the time series and its even and odd components are related by $$S_{xx}(e^{j\omega}) = S_{oo}(e^{j\omega}) + S_{oo}(e^{j\omega}) \quad (6)$$

wherein the Fourier transforms of each may be represented by $$X(e^{j\omega}), E(e^{j\omega})e^{-j\omega T}, jO(e^{j\omega})e^{-j\omega T}, \quad (7)$$

with the even and odd components having real and imaginary portions. The phase $\theta(\omega)$ may be defined as $$\theta(\omega) = \text{Arctan} \frac{O(e^{j\omega})}{E(e^{j\omega})} \tag{8}$$

where $O(e^{j\omega})$ and $E(e^{j\omega})$ are the real functions of $\omega$ for the even and odd components and the factor $e^{-j\omega T_s}$ is due to the fact that the origin of symmetry is $T_s = N_s \Delta t_o$ where $N_s$ is the number of data samples to the center of the data block and $\Delta t_o$ is the sample spacing. From this, it may be shown that $$\cos[2\theta(\omega)] = \frac{S_{oo}(e^{j\omega}) - S_{oe}(e^{j\omega})}{S_{ee}(e^{j\omega}) + S_{oo}(e^{j\omega})} \tag{9}$$

wherein the even and odd power spectral terms $S_{ee}(e^{j\omega})$ and $S_{oo}(e^{j\omega})$ may be expressed in terms of the even and odd components of the predictor polynomial $H(z)$ yielding $$\cos[2\theta(\omega)] = \frac{P_o H_o(e^{j\omega}) H_o(e^{-j\omega}) - P_o H_o(e^{j\omega}) H_o(e^{-j\omega})}{P_o H_o(e^{j\omega}) H_o(e^{-j\omega}) + P_o H_o(e^{j\omega}) H_o(e^{-j\omega})} \tag{10}$$

To be consistent with the principles of Maximum Entropy, the point of even and odd symmetry is chosen at the median of the available data at $N_s = M/2$. The even series, $e(k)$ and the odd series $o(k)$, are put through their respective Maximum Entropy filters wherein the outputs will be the power spectra of $e_k$, $o_k$ accordingly. To obtain the cosine of twice the phase of $x_k$, the ratio of the difference and the sum of the even and odd series power spectra are computed.

Since the Maximum Entropy filters through which the even and odd series are processed are all pole, minimum phase filters, the right hand side of Equation 10 converges for all values of $\omega$, and the phase $\theta(\omega)$ can be calculated from Equation 10.

After the phase estimate of the sample data has been obtained by the Maximum Entropy Method, this estimate is used at 68 which provides a means to calculate the time delay of received echo waveforms by obtaining the power spectrum of the phase estimate, again using the Maximum Entropy Method. As an example, a pulse of ultrasonic energy traveling through a uniform lossless medium will be reflected from a boundary and the echo will be received at the point of origin of the signal. The incidence signal, $x(t)$ of ultrasonic energy will travel a total distance $2d$ through the medium which has a velocity of propagation $v$. The received signal, $y(t)$, will be a function of the delay time, $t_d$, where $t_d = 2d/v$. By preprocessing the echo signal according to the Maximum Entropy Method to yield the phase estimate described at 66, it may be shown that $$\cos 2\theta(\omega) = \cos[2\omega t_d] \tag{11}$$

where the argument will be proportional to the delay time of the echo with all data referenced to the origin of symmetry being the median of the available data acquired from the reflected echo waveform. The amount of delay with respect to a known point, being the point of even and odd symmetry, is captured as the "frequency" of a sinusoid. The "frequency" of the sinusoid can be extracted by obtaining the Maximum Entropy power spectrum of the phase estimate of the original data or COS2θ. The term "frequency" has been embedded in quotation marks because it has the unusual dimension of time incorporated therein.

Once the delay $t_d$ is known, the distance $d$ to the boundary may be determined at 70 which provides means to estimate echo contributions by determining the source of the echo waveform data.

Turning now to the experimental results shown in the remaining Figures, the apparatus and method of the invention were applied to a simplified experimental model to give some indication of the improved resolution and method of identifying the location of the sources of echoes in the sampled data. In the experimental model, a sheet of aluminum having a thickness 0.16 cm was placed into the path of ultrasound similar to that shown in FIG. 1. In the apparatus of FIG. 1, the ultrasound transducers 14 and 16 were 3.5 MHz focused transducers, mounted on opposing sides of a plastic tank containing water. In the analog to digital conversion of the received data, the data were oversampled at 20 M samples/second and then averaged for an effective sample rate of 10 M samples/second. Although the transducer energy is centered around the 3.5 MHz resonance of the transducer, the information content in the signal phase and amplitude is distributed around the unit circle in the z plane. It has been found that the poles of the all pole predictive filter convey their information as the unit circle is traversed, wherein the most rapid changes occur in the vicinity of the poles. Although the signal energy will be concentrated near the 3.5 MHz transducer frequency, the computation of the prediction error filter coefficients, and therefore the pole locations, will evidence the information from the poles of the predictive filter on the whole unit circle. If only the information on the unit circle adjacent to the poles would be to window the result, thereby eliminating useful information for the Maximum Entropy phase estimation. Therefore, the entire unit circle is traversed in the Z plane using transform calculations to obtain the entire information content of the waveform data for the phase estimation using the Maximum Entropy Method.

Further in the experimental configuration, a bi-junction transistor was used to discharge a capacitor across the transmitter transducer 14 to obtain a sufficiently large signal. The received signal at transducer 16 was sufficiently large to be digitized by a Tektronix Model 2220 digital oscilloscope at 24 without prior amplification.

Figure 5:
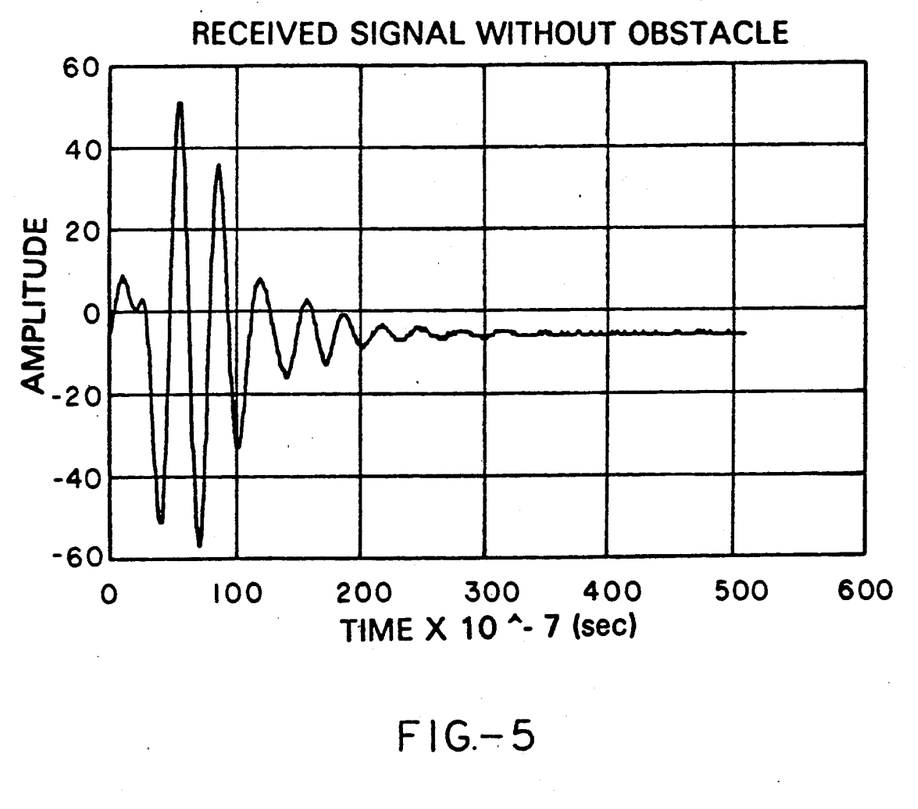
FIGS. 5-7 set forth graphical representations of experimental results showing a received echo signal without multiple reflections wherein the amplitude will provide digitized values for subsequent processing, the phase information obtained therefrom by the method of the invention and the estimate of the time delay of the received signals respectively.
Figure 6:
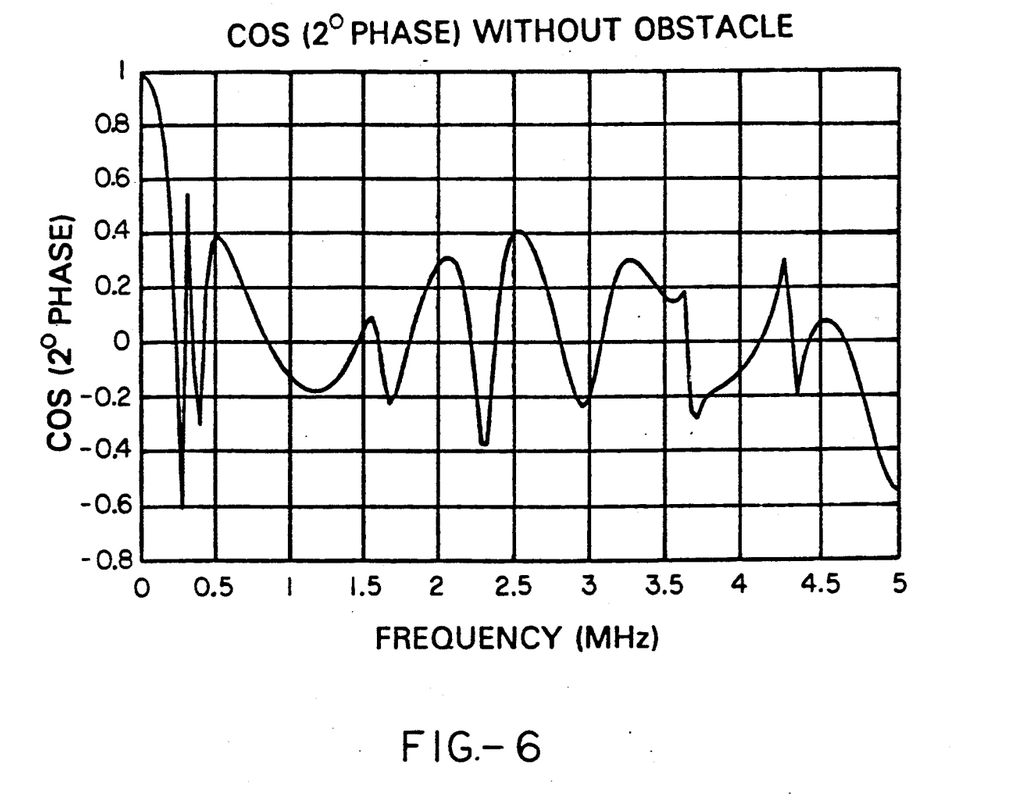
Figure 7:
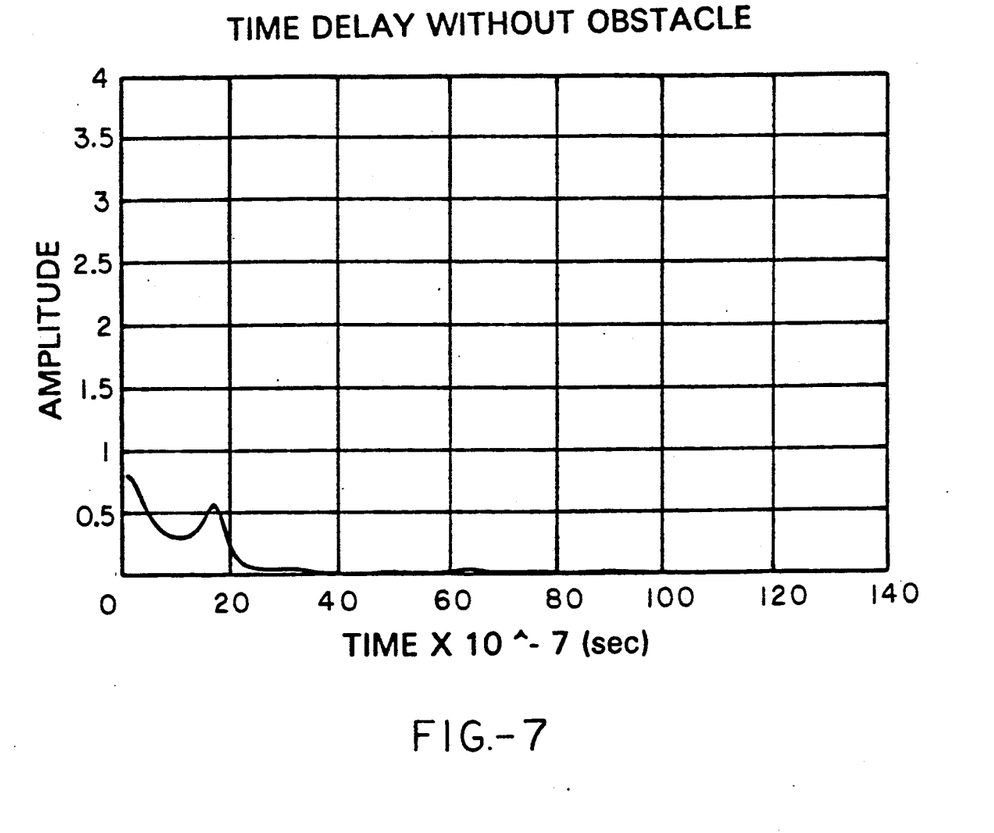

In a first example, a direct transmission of the pulse from the 3.5 MHz transducer 14 to receiving transducer 16 of the same frequency is shown, wherein the obstacle 12.5 removed from the water tank 10 in the apparatus of FIG. 1. Turning to FIG. 5, the signal without an obstacle in the ultrasound path is shown which does not have multiple reflections therein. The amplitude of the received waveform is the digitized value, which may be regarded as a relative value. Utilizing the method of the invention as previously described, the phase estimate $\theta(\omega)$ can be calculated from Equation 10 which gives the cosine of twice the phase angle being shown in FIG. 6. Proceeding with the method as previously defined, the spectrum of the phase estimation data as shown in FIG. 6 yields the echo identification giving a delay time as shown in FIG. 7.

Figure 8:
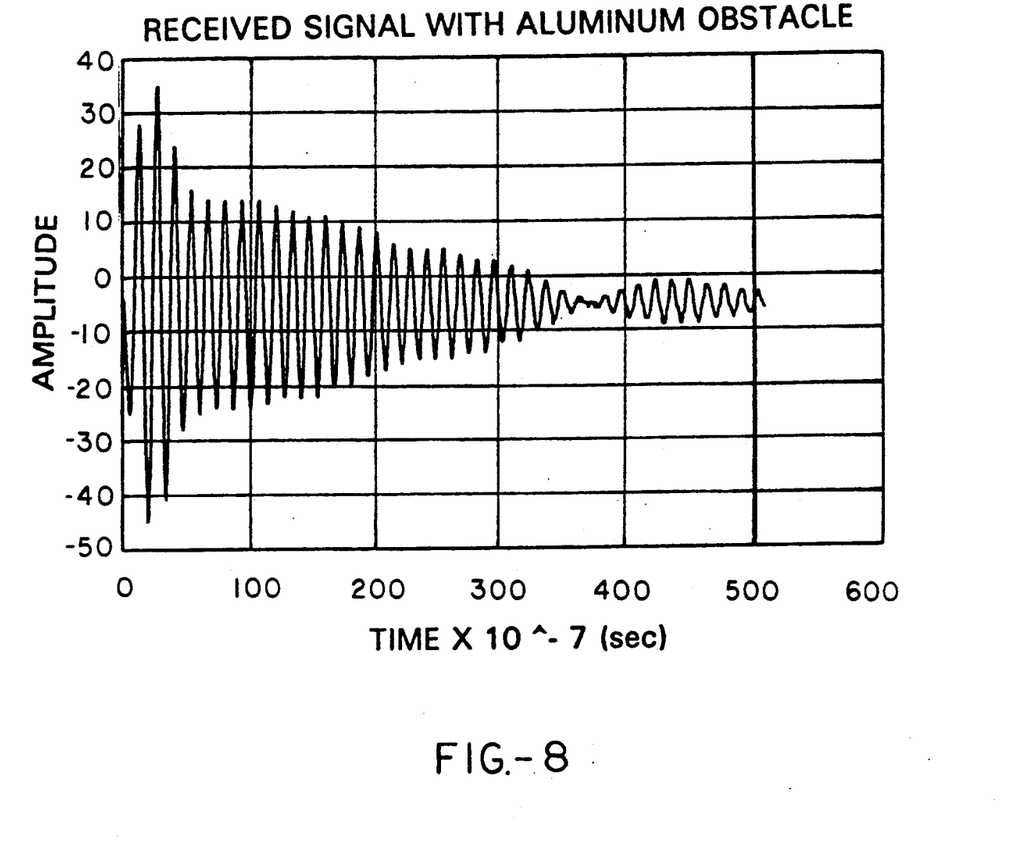
FIGS. 8-10 set forth graphical representations of received echo signals with multiple reflections present yielding phase information by means of the method in the present invention and an estimate of the time delay respectively giving an indication of the source of echo information to enable estimation of echo contributions and to improve resolution of the received signals.
Figure 9:
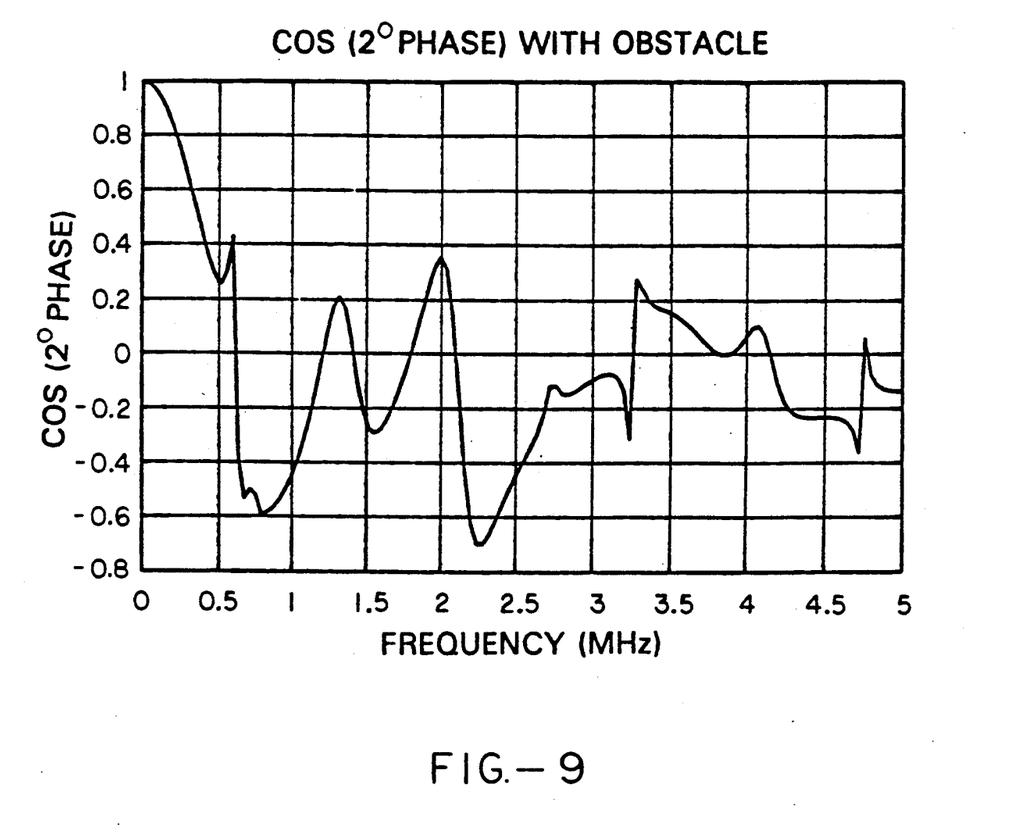
Figure 10:
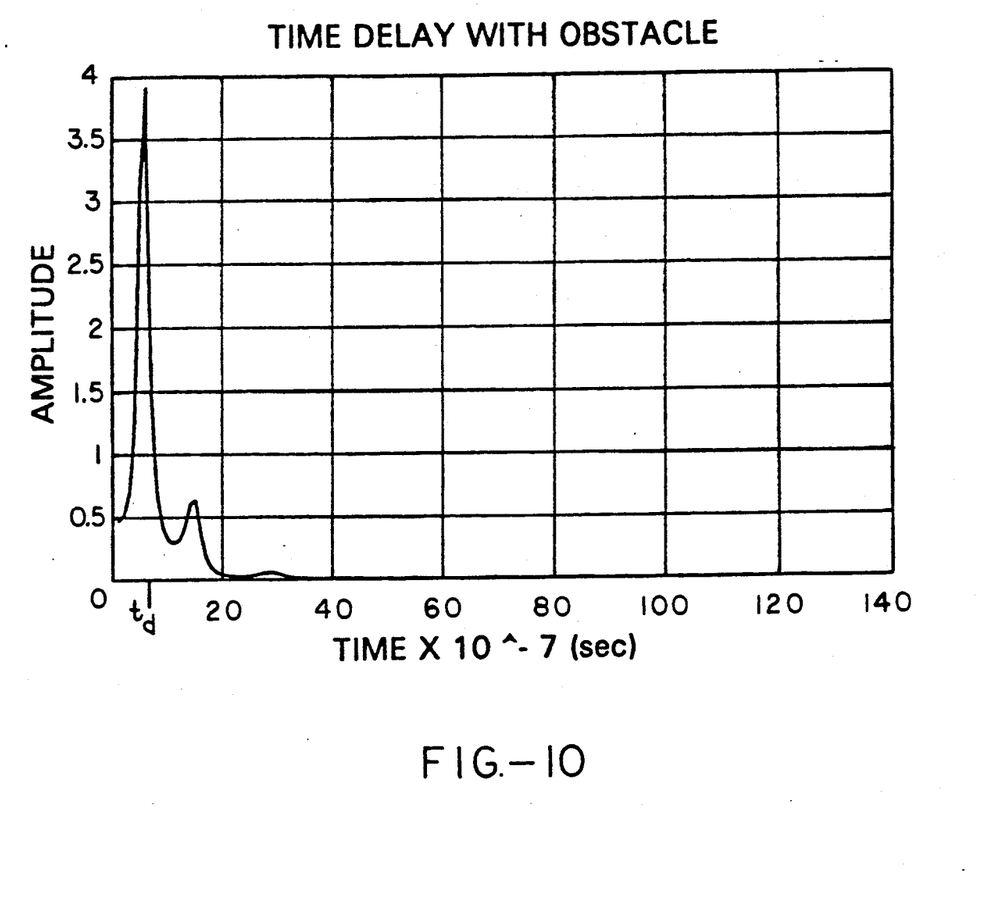

Turning to FIG. 8, after the thin aluminum sheet is placed in the water of tank 10 as an obstacle shown at 12 in FIG. 1, the received signal shows a long, ill-defined reflected signal indicating multiple reflections as contrasted with FIG. 5. The extended echo of FIG. 8 appears without clear delineation between the different components of the multiple echo, making interpretation of the obtained waveform data extremely difficult. Using the method of the invention, the phase estimation being the cosine of twice the phase angle is shown in FIG. 9, wherein the oscillatory nature of the curve enables identification of the multiple echoes as shown in FIG. 10. In FIG. 10, the position of the first peak corresponds to the time of transit through the aluminum sheet which comprises the test obstacle. This transit time is the round trip or twice the path length within the 0.16 cm obstacle. The distance, d, to the boundary may be computed from the time delay calculation as shown in FIG. 10, wherein for the experiment described above, this sample calculation is $$d = \tfrac{1}{2}(6420 m/s)(0.5 us) = 1.6 mm$$

which is seen to verify and identify this source of multiple echoes. It is also noted that the relative amplitudes of the multiple echoes are consistent. Based upon this simplified experimental arrangement, the computed value of $t_d$ was found to be quite accurate and only limited by the resolution obtained in digital transformation of the data. The resolution can be improved by increasing the number of samples, but at the expense of increased filter lengths in the processing. Further experimental results show that the method provides stable delay detection with respect to variation of data length and additive noise, with accuracy being a function of filter length only. Although a simplified model has been used to give an indication of results obtainable by the method and apparatus of the invention, it should be apparent that the invention can be extended to more complex systems in a variety of areas such as medical sonography, ultrasound non-destructive testing, echocardiography, underwater sonar, radar and geophysical data as previously described. The invention may also be applied to dispersive media to detect group delays as well as phase delays beneficially.

Although the invention has been described with respect to ultrasound reflectometry in some detailed aspects thereof, it should be obvious that many modifications and variations of the present invention are possible in the light of the general concepts of the disclosed invention. It is therefore understood that the invention may be practiced other than as specifically described herein and is only limited by the scope of the appended claims.

What is claimed is:

1. A method for performing waveform processing comprising the steps of:
    obtaining waveform signals in the form of analog data signals by means of detection means,
    transforming said analog data signals to a digital data signal,
    obtaining a phase estimate of said digital data signal by generating a power spectral estimate of said digital data signal by means of a technique known as the Maximum Entropy Estimation Method, and processing said power spectral estimate to yield said phase estimate,
    obtaining an estimate of the delay time of said waveform signals which are reflected from an interface boundary in a medium,
    determining the distance to said interface boundary by means of said estimate of the delay time to locate the sources of said waveform signals,
    processing said waveform signals to account for the sources generating these signals to minimize the contribution of predetermined waveform signals.

2. A method for performing waveform processing as in claim 1, wherein,
    the step of obtaining said phase estimate of said digital data signal includes modeling the system as an all pole, minimum phase filter which yields a smoothly changing phase estimate of said digital data signal.

3. A method for performing waveform processing as in claim 1, wherein,
    said step of obtaining a phase estimate of said digital data signal includes the steps of utilizing the even and odd components of said digital data signal and computing a prediction filter for each of said even and odd components from which said power spectral estimate can be generated.

4. A method for performing waveform processing as in claim 1, wherein,
    said step of obtaining a phase estimate of said digital data signal includes computing the coefficients of a minimum phase filter to generate a prediction filter which adequately represents said digital data signal in systems where said digital data signal is only partially available and the unknown portion of said digital signal must be predicted.

5. A method of performing waveform processing as in claim 1, wherein,
    said step of obtaining a phase estimate includes generating a power spectral estimate of the even and odd components of said digital data signal wherein the phase, $\theta(\omega)$, is related to the power spectral estimate as represented by the following:

$$\text{Cos}[2\theta(\omega)] = \frac{S_{oo}(e^{j\omega}) - S_{oe}(e^{j\omega})}{S_{ee}(e^{j\omega}) + S_{oe}(e^{j\omega})}$$

which may be shown to yield $$\text{Cos}[2\theta(\omega)] = \frac{P_o H_o(e^{j\omega}) H_o(e^{-j\omega}) - P_o H_o(e^{j\omega}) H_o(e^{-j\omega})}{P_o H_o(e^{j\omega}) H_o(e^{-j\omega}) + P_o H_o(e^{j\omega}) H_o(e^{-j\omega})}$$

wherein the phase $\theta(\omega)$ can then be calculated.

6. A method for performing waveform processing as in claim 5, wherein,
    said step of obtaining an estimate of the delay time utilizes the phase estimate which is related to the delay time as follows:

$$\text{Cos}2\theta(\omega) = \text{Cos}(2\omega t_d)$$

where the argument is proportional to the delay time of the echo waveform data.

7. A method for performing waveform processing as in claim 6, wherein,
    said step of determining the distance to said interface boundary utilizes the estimate of the delay time wherein the distances related to the delay time by the following:

$$t_d = 2d/v$$

where d is the distance to said interface boundary and v is the velocity of the waveform signal in the medium through which it travels.

8. A method for performing waveform processing as in claim 1, wherein,
said waveform signals are echo signals and said step of determining the distance to said interface boundary enables identifying the echo location of the source of echoes wherein said waveform data includes overlapping echoes which tend to obscure waveform data, wherein identification of the echo location of the source of said overlapping echoes allows minimization of the contribution of said overlapping echos.

9. A method for performing waveform processing as in claim 1, wherein,
said step of obtaining an estimate of the delay time includes obtaining a power spectrum of the phase estimate by means of the Maximum Entropy Estimation Method, wherein the power spectrum of the phase estimate curve exhibits a peak at a time corresponding to said delay time.

10. A method for performing waveform processing as in claim 1, wherein,
said waveform data is generated in an ultrasound reflectometry system.

11. A method for performing waveform processing as in claim 1, wherein,
said waveform data is generated in a medical sonography application.

12. A method for performing waveform processing as in claim 1, wherein,
said waveform data is generated in an acoustic non-destructive evaluation and testing application.

13. A method for performing waveform processing as in claim 1, wherein,
said waveform data is generated in a radar system.

14. A method for performing waveform processing as in claim 1, wherein,
said waveform data is generated in a sonar system.

15. A method for performing waveform processing as in claim 1, wherein,
said waveform data is generated in a seismology application.

16. A method for performing waveform processing as in claim 1, wherein,
said waveform data is generated in an echocardiography application.

17. A method for performing ultrasound reflectometry comprising the steps of:
generating ultrasound waveforms within a medium by a transducer means,
detecting ultrasonic echo signals in the form of analog data signals by transducer means,
transforming said analog data signals to a digital data signal,
obtaining a phase estimate of said digital data signal by generating a power spectral estimate of said digital data signal by means of a technique known as the maximum entropy estimation method, and processing said power spectral estimate to yield said phase estimate,
obtaining an estimate of the delay time of said ultrasound echo signals which are reflected from an interface boundary within said medium,
determining the distance to said interface boundary by means of said estimate of the delay time to locate the sources of said echo signals,
processing said echo signals to account for the sources generating the ultrasound echo signals wherein the contribution of predetermined echo signals is minimized.

18. A method for performing ultrasound reflectometry as in claim 17, wherein,
the echo waveform data is generated in a medical sonography technique.

19. A method for performing ultrasound reflectometry as in claim 17, wherein,
the echo waveform data is generated in a acoustic non-destructive evaluation and testing application.

20. A method of identifying the echo location of the source of echoes in echo waveform data, which comprises the steps of:
obtaining echo waveform signals in the form of analog data signals by means of detection means,
transforming said analog data signals to a digital data signal,
obtaining a phase estimate of said digital data signal by generating a power spectral estimate of said digital data signal by means of a technique known as the Maximum Entropy Estimation Method, and processing said power spectral estimate to yield said phase estimate,
obtaining an estimate of the delay time of said echo signals which are reflected from an interface boundary in a medium,
determining the distance to said interface boundary by means of said estimate of the delay time to locate the sources of said echo signals.

21. An apparatus to perform waveform processing, comprising:
means to generate waveforms in a medium which will be reflected for interface boundaries within said medium to form said echo waveforms in said medium,
means to detect said echo waveforms to generate analog echo data signals,
means to transform said analog echo data signals to a digital data signal,
means for processing said digital data signal to generate a power spectral estimate thereof by means of maximum entropy estimation,
means to calculate a phase estimate of said digital data signal using said power spectral estimate, and calculating an estimate of the delay time of said echo signals being the travel time within said medium to said interface boundary,
means to calculate the distance to said interfaced boundary using said estimate of the delay time so as to locate the echo source of said echo waveforms,
means for processing said digital data signal to account for the sources of said echo waveforms wherein the contribution of predetermined echo waveforms is minimized.

* * * * *